Feb. 20, 1962
H. C. GRAHAM
3,021,772
FILM HOLDER
Original Filed Nov. 12, 1957
4 Sheets-Sheet 1
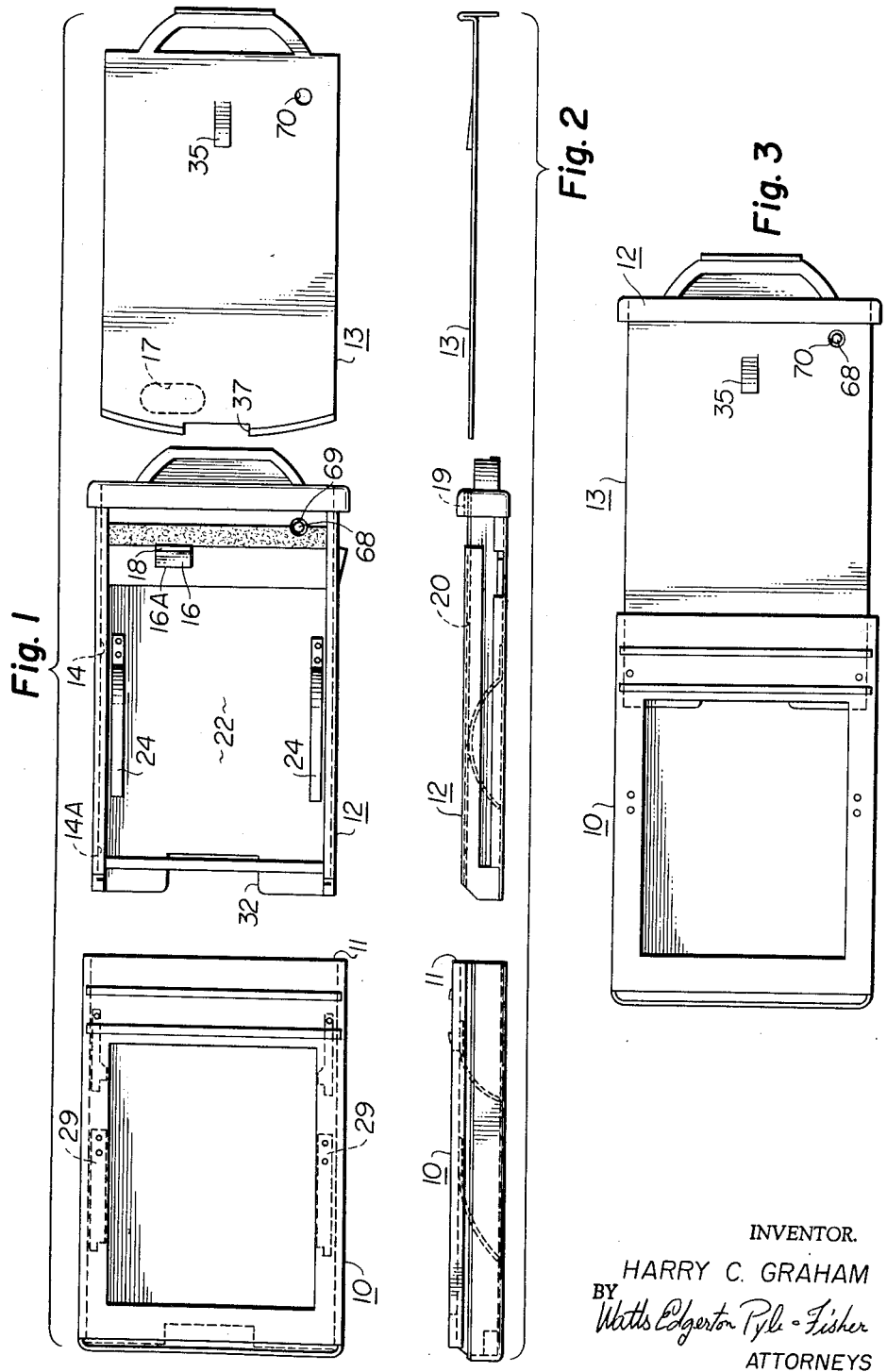
INVENTOR.
HARRY C. GRAHAM
BY
Watts Edgerton Pyle - Fisher
ATTORNEYS Feb. 20, 1962  H. C. GRAHAM  3,021,772
FILM HOLDER
Original Filed Nov. 12, 1957  4 Sheets-Sheet 2
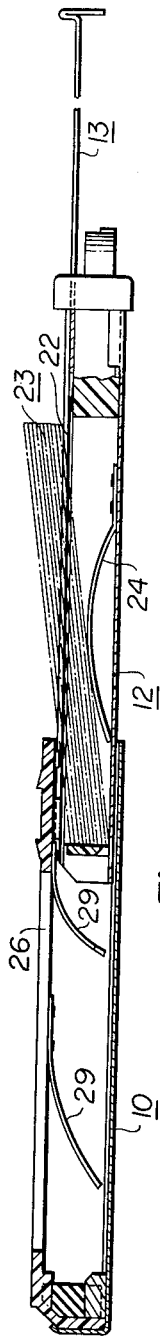
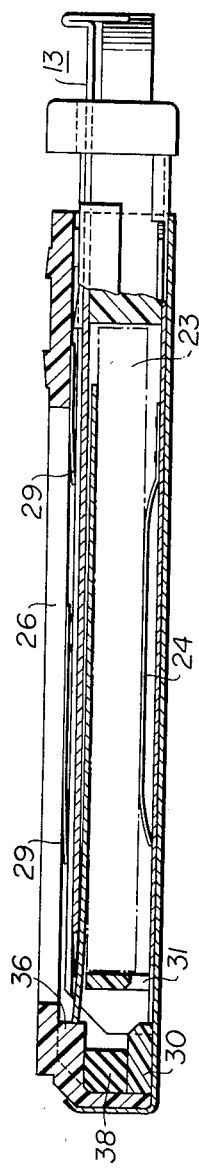
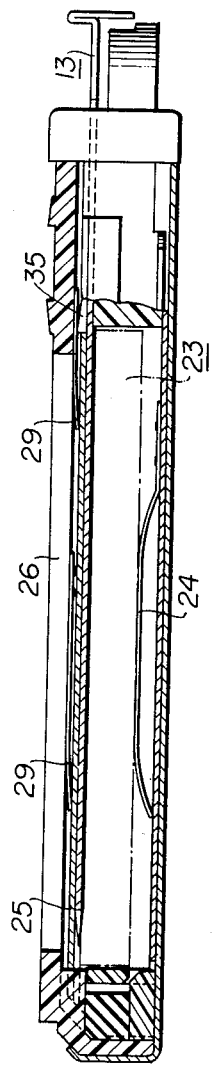
INVENTOR.
HARRY C. GRAHAM
BY
ATTORNEYS Feb. 20, 1962

H. C. GRAHAM 3,021,772

FILM HOLDER

Original Filed Nov. 12, 1957

INVENTOR.
HARRY C. GRAHAM
BY
ATTORNEYS

Feb. 20, 1962 H. C. GRAHAM 3,021,772
FILM HOLDER
Original Filed Nov. 12, 1957 4 Sheets-Sheet 4

INVENTOR.
HARRY C. GRAHAM
BY
ATTORNEYS

United States Patent Office 3,021,772
Patented Feb. 20, 1962

3,021,772
FILM HOLDER
Harry C. Graham, Cleveland, Ohio, assignor of one-half to Ewald Gottwig, one-fourth to Gilbert Savransky and Robert L. Keyes, jointly, and one-fourth to Agnes D. Graham
Original application Nov. 12, 1957, Ser. No. 695,953, now Patent No. 2,929,306, dated May 22, 1960. Divided and this application Jan. 22, 1960, Ser. No. 15,004
3 Claims. (Cl. 95—30)

This application is a division, under Rule 147, of application Serial Number 695,953, filed November 12, 1957, now Patent Number 2,929,306.

This invention relates to film holders, and it is particularly directed to the type of film holder in which a plurality of septums are held in stacked relationship with the septums being advanceable one at a time from the top of the stack to an exposure position and thence to the bottom of the stack.

This invention has as one of its principal objects a novel and improved mechanism in which external mechanisms indicate the internal condition of the film holder both as to the number of plates which have been exposed and as to whether or not one of the plate carrying septums is in a position ready for exposure.

Another of the objects of this invention is to provide a novel and improved film holder having a housing and a drawer reciprocally carried in the housing and in which a mechanism is provided which prevents accidental opening of the drawer without interfering with intentional opening of the drawer.

Still another object of this invention is to provide a novel and improved device in which the mechanism for preventing accidental opening of the drawer is tied to and forms a part of the counting mechanism.

A further object of this invention is to provide a film holder which includes a counting mechanism having a neutral position to prevent recycling of the counter prior to reloading.

A still further object of this invention is to provide a film holder of the type having a housing, a drawer reciprocal in the housing, and a slide curtain reciprocal in the drawer in which a slide curtain locking mechanism is activated by a novel and improved counter mechanism when the latter mechanism reaches its neutral position and thereby double exposures are prevented.

Yet another and more detailed object of this invention is to provide a novel and improved film holder which has alignment means formed within the housing to prevent the septums from becoming misaligned or mislocated during operation of the device and thereby prevent the device from becoming jammed.

These listed objects will outline the invention, but other objects and a fuller understanding of the invention may be had by referring to the following description and claims, taken in conjunction with the accompanying drawings, in which:

FIGURE 1 is a top plan view in an exploded form of the housing, slide drawer, and slide curtain respectively;

FIGURE 2 is an exploded side plan view corresponding to the device as disclosed in FIGURE 1;

FIGURE 3 is a top plan view of the device assembled and with the drawer in an open position and the slide curtain in a closed position;

FIGURE 4 is a sectional view of an assembled device with the drawer and slide both in open positions and a stack of septums in a position which may be either insertion or removal;

FIGURE 5 is a sectional view of the device in an almost closed position;

FIGURE 6 is a sectional view of the device with one of the septums indexed to a position for exposure of the photographic plate;

Figure 7:
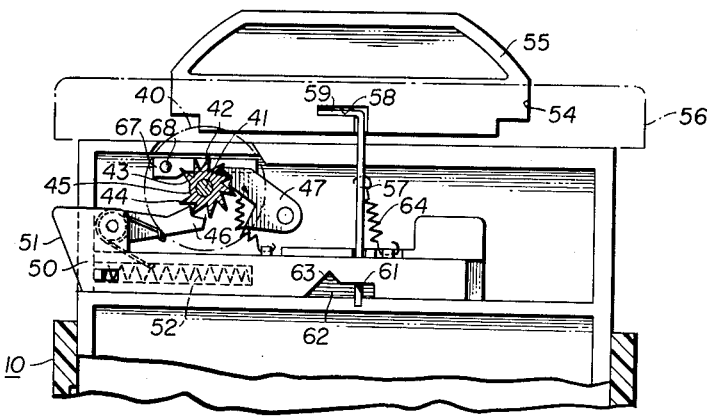
FIGURES 7 through 9 are fragmentary sectional views showing sequential steps in the operation of both the counting mechanism and the interrelated latch mechanism.

Referring to the drawings, a housing is shown generally at 10. The housing 10 has a drawer receiving opening at a drawer receiving end 11, which is the right hand end in FIGURES 1 through 3. A drawer shown generally at 12 is reciprocally carried in the housing and projects from end 11. A slide curtain 13 is, in turn, reciprocally carried in guideways 20 by the drawer 12, and projects through a guide slot 19.

The drawer 12 has two side grooves, one of which is shown in dotted lines at 14 in FIGURE 1. Each groove 14 receives a projection (not shown) carried by the housing 10. Each groove ends at an abutment 14A. Coaction of this projection and the abutment end 14A prevents the drawer from being pulled completely from the housing. The housing is assembled around the drawer 12 to position of the mentioned projection into the guide track 14.

The slide curtain is also prevented from being fully removed from the slide drawer. This is accomplished by providing a spring loaded stop 16 and a mated recess 17 in the slide carried by the drawer. The stop is urged against the slide and into the recess 17. The stop 16 has a sharp edge 16A to catch the recess 17 and prevent movement of the slide beyond this point of engagement. A cam surface 18 coacts with the edge of the slot 17 to retract the stop 16 when the slide is closed.

The drawer 12 is defined by bottom and side walls with an open top loading aperture 22. The loading aperture is of sufficient dimension to permit film holding septums to pass therethrough flatwise. In FIGURE 4 the drawer 12 and the slide 13 are both shown in open positions. When the holder is so positioned a stack of septums 23 may be passed through the aperture 22 and into the drawer. Springs 24 are carried on the bottom wall of the drawer. The stack of septums 23 are then pressed down against the urging of springs 24 and the slide 13 is closed to retain the stack within the drawer. The drawer is then closed into the housing 10 and the device is ready for connection to a camera.

In operation, the slide 13 is opened with respect to the drawer. This permits the stack of septums 23 to shift upwardly under the urging of the springs 24 until a top septum 25 is positioned adjacent an exposure aperture 26 in the housing 10. Hereafter the top or next-to-be exposed septums will always be referred to as septum 25. The slide 13 is then closed, and in so closing wedges between the top septum 25 to strip it from the pile and press the remainder of the stack 23 back into the drawer. Thus, the top septum 25 is moved into the exposure position seen in FIGURE 6.

Septum return springs 29 are carried by the housing 10 along opposite sides of the exposure aperture 26. These springs are compressed by the closing of drawer 12, and further compressed by the wedging of top septum 25 to the exposure position. After an exposure has been made, the drawer is opened and return springs 29 are released to drive the exposed septum 25 away from the exposure aperture and against the back wall of the housing opposite from the exposure aperture. As the drawer is closed, an indexing projection 30 in the housing holds the exposed septum against movement in the direction of drawer closing and the drawer is closed to drive the exposed septum through a septum receiving slot 31 in the bottom of the drawer. A relief 32 as best shown in FIGURE 1 is provided in the lower surface of the drawer to permit the indexing projection 30 to enter the drawer to the necessary degree for proper positioning of the exposed septum at the bottom of the stack. By this described cycling technique, which is repeated for each desired exposure, septums are stripped one at a time from the top of the stack moved into an exposure position, and then shifted to the bottom of the stack all without danger of light exposure or other damage.

In the use of rapid index film holders of this general type it is essential that the photographer be able to see at a glance whether a film is in the exposure position. His mind is, of necessity, directed to many matters and the mechanics of the film holder can be a distraction if not fully reliable. This invention provides a most simple and foolproof device to indicate the presence or absence of a septum at the exposure position. Thus, the operator need not worry about whether he remembered to index a septum above the slide after removing the former exposed film.

A septum contacting projection 35 is provided on the slide 13. The projection 35 contacts an edge of the septum 25 which is positioned for exposure. The location of the projection prevents the slide from returning fully into the drawer. This contact and incomplete return position is illustrated in FIGURE 6. The septum contacting projection 35 serves a dual and novel function. First, it forces the septum rearwardly with respect to FIGURE 6 against the housing to assure its proper longitudinal positioning. At the same time, its partially outward position is an indication to the operator that a septum is at the exposure aperture and ready for exposure. When there is no septum and no contact, the slide nests deeper into the slot 19 than when such contact exists. Therefore, there is an edge portion of the slide which is hidden when there is no contact, and exposed when there is such contact. The portions of the slide exposed when the septum 25 is at its exposure position may be painted with a color which contrasts with the remainder of the device to provide a readily recognizable visual indication of the readiness of the mechanism. In actual practice red was chosen. Thus, when a septum is in position ready for exposure, a red line is seen. When no such septum is in position, there will be no red line.

Another of the desirable features of the illustrated embodiment is portrayed in FIGURE 5. An anti-jam projection 36 is formed in the interior of the housing at the same end and opposite from the indexing projection 30. The anti-jam projection 36 will contact any septums which have come partially out of the drawer and force them back into the drawer as the drawer is closed. Septums when loaded with film tend to adhere somewhat to the slide. The result is a condition which can lead to the top septum being shifted to the position shown in FIGURE 5 as the newly loaded stock is closed into the housing. Often the second septum will slide forward when the slide is forced between the first and second septums to move the top one to the exposure position. The anti-jam projection 36 is receivable in a notch 37 formed in the slide 13. See FIGURE 1. This permits the projection 36 to extend into the drawer when the device is closed and thereby assure proper alignment of the stack. The anti-jam projection 36 also coacts with the septum contacting projection 35 to assure proper location of septum 25 which is to be exposed. A sponge rubber pad 38 is preferably positioned between the alignment projections 30 and 36 at the end of the housing 10. The pad 38 cushions the drawer on closing.

In FIGURES 7 through 12 the novel combined counting and lock mechanism of this invention is disclosed. This mechanism has several outstanding advantages. It is activated by a latch mechanism which is so constructed as to provide a lock for the drawer when the drawer is closed. The latch mechanism is retractable in a novel manner to permit intentional opening of the drawer without hindrance, even though it prevents unintentional opening of the drawer, as from vibration, for example. The counter mechanism has a neutral position which is reached when the drawer is cycled a predetermined number of times, which should be equal to the number of septums held. The mechanism also has a slide curtain lock which fixes the slide in a closed position when such lock cycle has been completed, thereby preventing double exposures.

Visually, the counting and lock mechanism centers around a numbered station indicating wheel 40 which is rotatively carried on a pin 41. The pin 41 is fixed to the drawer 12. A ratchet gear 42 is provided as an integral part of the numbered wheel 40. The disclosed and preferred gear 42 has a first tooth 43 and nine successive equally spaced teeth concluding with the tenth or last tooth 44. A large neutral space 45 is provided between the first and last teeth 43, 44. A pawl 46 is provided to drive the ratchet gear 42 and the connected indicating wheel 40. Indexing of the ratchet 42 and the wheel 40 must, obviously, be related to movement of the drawer with respect to the housing. To provide such relationship, a cam latch member 50 is carried by the drawer. Latch 50 is carried in groove guide surfaces of the drawer for reciprocal movement along a path transverse to the path of drawer reciprocation. The back side 51 of latch 50 is positioned to strike the housing 10 as the drawer is closed, and be driven to the position shown in FIGURE 8. Drive force, coupled to the drawer closing movement, is thereby provided to drive pawl 46 and index the ratchet 42 and indicator wheel 40. By the use of proper indicia, the wheel 40 will thereby indicate the number of times the drawer has been opened and reinserted into the housing 10. It will also indicate the septum number in the exposure position, provided the slide has been actuated after each drawer closing. It will be seen that when the tenth septum has been shifted to the bottom of the pile and the counting mechanism has registered for the tenth time, the pawl will be aligned with the neutral space 45. The large neutral space is proportioned such that pawl 46 cannot engage the first tooth 43 after indexing the last tooth 44, unless the wheel 40 is manually moved to bring tooth 43 to indexing position. Therefore, after pawl 46 has indexed the tenth position, the ratchet gear will not be moved further. A spring loaded detent 47 rides against the ratchet gear 42 and aids in indexing the ratchet gear and the associated counter wheel 40 from station to station. This described indexing counter, wherein the counting is stopped after one full cycle, is an outstanding advance in the film holder art. However, if no more, an unobserving operator could continue to recycle the stack even though the counter did not function.

Accordingly, this invention provides additional mechanism which causes the slide to lock in the drawer upon advancement of the ratchet wheel to the neutral condition. Thus locked, the wheel 40 must be manually moved to the number one, or start position, before the slide will be released. The operator, of course, will not so shift the counter until he has changed the septums.

In FIGURE 7 the top view of a leaf spring 67 and lock pin 68 may be seen. The spring and pin may be further related to their environment by referring to FIGURES 1 and 3. Pin 68 is in axial alignment but not disposed in the registered holes 69 and 70 when in the neutral position; but in the engaged position the pin 68 extends through the registered holes 69 and 70 in the drawer and slide respectively. The slide is thereby locked against movement by the pin 68.

Figure 12:
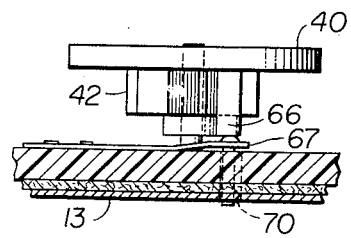

As best seen in FIGURE 12, the ratchet wheel has a lateral arm 66 which has the appearance of an extra ratchet tooth. This arm 66 presses upon the spring 67 as the ratchet wheel rotates to the neutral position and causes the locking movement.

Therefore, it will now be understood that the neutral position of the ratchet and counting wheel will not only bring an end to counting but will also lock the slide and thereby prevent further septum indexing. The drawer may still be actuated, but no counting will take place and no septums will be indexed.

As thus described, it would appear that a pulling force upon the slide 13 to index a septum would pull the drawer from the housing, unless the drawer were held against such tendency. The operator could forget to hold the drawer and thus expose all of the film, and therefore it is an object of this invention to provide a holding mechanism that will grip the drawer in the closed position until properly released. Further, it is the object of this invention to grip and release the drawer without conscious effort on the part of the operator.

Figure 8:
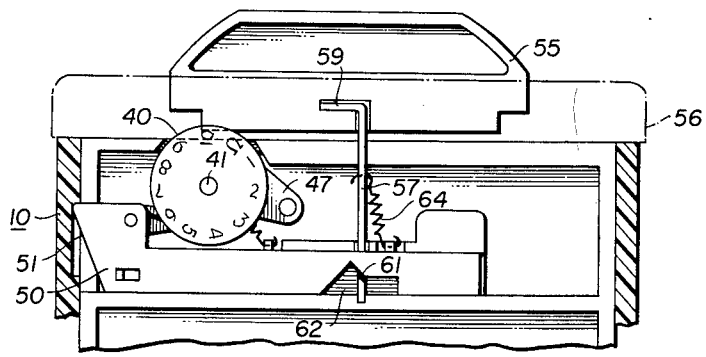
Figure 9:
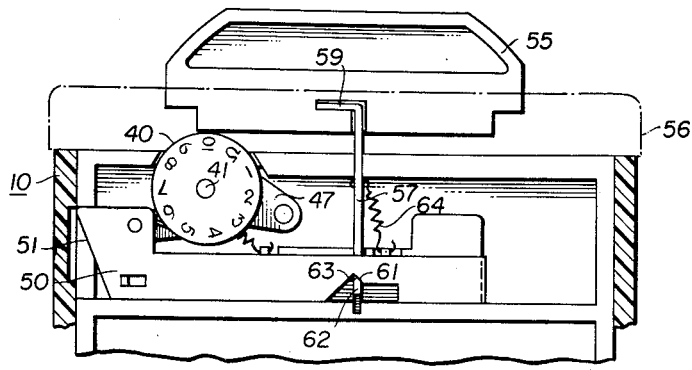
Figure 11:
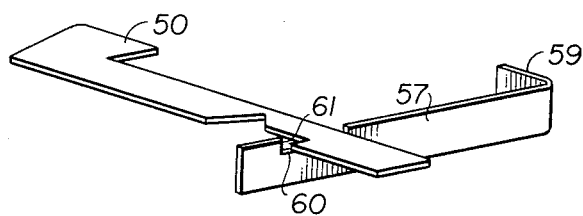
FIGURE 11 is a perspective view on a enlarged scale with respect to FIGURES 7 through 9 showing the latch member and the activation member for retracting the latch; and, FIGURE 12 is a fragmentary view partially in section showing portions of the counting mechanism and the slide locking mechanism which prevents double exposures.
Figure 10:
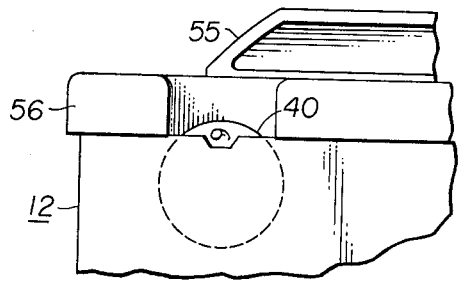
FIGURE 10 is a fragmentary bottom plan view of the holder showing the face of the indicating wheel of the counting mechanism.

In referring to FIGURES 7 and 8 to illustrate the counting and locking under the cam drive actuation of member 50, it may have been observed that the member 50 does not move fully into the drawer when the drawer is closed. The member 50 is used as a latch. An internal slot 53 is a catch into which the latch may drop when the drawer is closed. A spring 52 provides a constant return urge to the member 50, and therefore the catch tends to drop into the slot 53, but the forward edge of the member 50 is transverse rather than slanted and therefore there is no cam action to overcome the urge of spring 52 to release the catch.

The means to accomplish such drawer holding action is integrated into the counting index mechanism. Since this mechanism also serves as the lock which is not self-releasing, a separate releasing drive means is provided which operates from a natural operator action without awareness on the part of the operator.

Once the drawer is closed, the next function is to pull out the slide only, and thereafter return the slide. After exposure, then, the entire drawer—slide included—is pulled. To pull just the slide, the operator will grasp just the slide handle at "X" in FIGURE 6, but to pull the entire drawer he will grasp at both "X" and "Y."

The drawer 12 has an end portion 56 which butts against the end 11 of the housing to close the housing. A drawer handle 55 is mounted in a socket 54 and is held therein only by connection to the release drive mechanism which it is designed to actuate. It may therefore be said that handle 55 is reciprocally carried by the drawer. To provide a suitable fastening for a latch activation bar 57, an L-shaped notch 58 is formed in the handle 55. The latch activation bar 57 has a bent end portion 59 which is located in the notch 58. At the opposite end of the activation bar, a latch receiving notch 60 is formed. The activation bar 57 thus extends under the latch member 50 with the latch member projecting through the notch 60. The end 61 of the notch remote from the bent end 59 serves as a cam surface. The latch member 50 has an elongated notch 62 formed in it to receive a portion of the activation bar 57. The notch 62 has a cam surface 63 formed to coact with the activation bar cam surface 61.

When the latch 50 is in its locked position as shown in FIGURE 8, the activation bar 57 is aligned with it so that if the cam surface 61 is pulled by handle 55 it will contact the cam surface 63. Thus in the position of FIGURE 8 the drawer is locked in the housing. Vibration or careless use will not jar the drawer loose from the housing. However, as soon as the handle is gripped to pull the drawer open, activation bar 57 shifts longitudinally. As this outward movement of the handle 55 relative to the drawer 12 occurs, the cam surfaces 61, 63 come into contact and coact with one another. This cam action causes the latch 50 to be retracted to the position of FIGURE 9 which in turn permits the drawer to open in response to the pulling forces. Thus, the operator pulling on the handle will open the drawer without even realizing that he has exerted forces which release the latch.

As soon as the handle 55 is released, the spring 52 which is constantly urging the latch outwardly will drive the latch to the locked position of FIGURE 8 or the open position of FIGURE 7, depending upon the position of the drawer. This outward movement of the latch through coaction of the cam surfaces 61, 63 will pull the handle 55 inwardly to its rest or retracted position. A spring 64 is also included to aid in this movement and to urge the handle inwardly at all times.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. In a film holder having a housing and a relatively reciprocal slide drawer element, the improvement therein which comprises an indicia member exposed to the exterior of the holder, a toothed member in driving relationship to said indicia member, a drive pawl, means coacting between said housing and drawer to cycle said pawl each complete open and close cycle of said drawer, said toothed member having a selected number of regularly spaced teeth in sequence followed by a space unengageable by said pawl, and means actuatable by said tooth member engageable with said slide drawer element at a preselected position of the toothed member to prevent movement of film in the slide drawer element, whereby cyclic open and close movement of the drawer will be counted by said indicia member up to the said selected number of teeth whereafter further cycles will fail to register.

2. In a film holder having a housing and a relatively reciprocal slide drawer element, said drawer having a curtain slide cover, the improvement therein which comprises, an indicia member exposed to the exterior of the holder, a toothed member in driving relationship to said indicia member, a drive pawl, means coacting between said housing and drawer to cycle said pawl each complete open and close cycle of said drawer, said toothed member having a selected number of regularly spaced teeth in sequence followed by a space unengageable by said pawl, a lock member having a first neutral position, a second position engaging said slide in a fixed closed position, a cam and cam follower means coacting between said toothed member and said lock member in the position of said toothed member attained when the pawl can no longer advance the toothed member to move said lock member from said first neutral position to said second position, whereby cyclic open and close movement of the drawer will be counted by said indicia member up to the said selected number of teeth whereafter further cycles will fail to register.

3. In the device of claim 2 wherein said lock member is a pin and wherein said curtain slide cover and said drawer each includes an aperture, and wherein in said second position said pin is disposed in each of said apertures.

References Cited in the file of this patent

UNITED STATES PATENTS

| | | |
|---|---|---|
| 1,955,300 | Kurnick | Apr. 17, 1934 |
| 2,463,878 | Johnson | Mar. 8, 1949 |
| 2,483,578 | Gallistel | Oct. 4, 1949 |
| 2,564,453 | Steiner | Aug. 14, 1951 |